Figure 3:
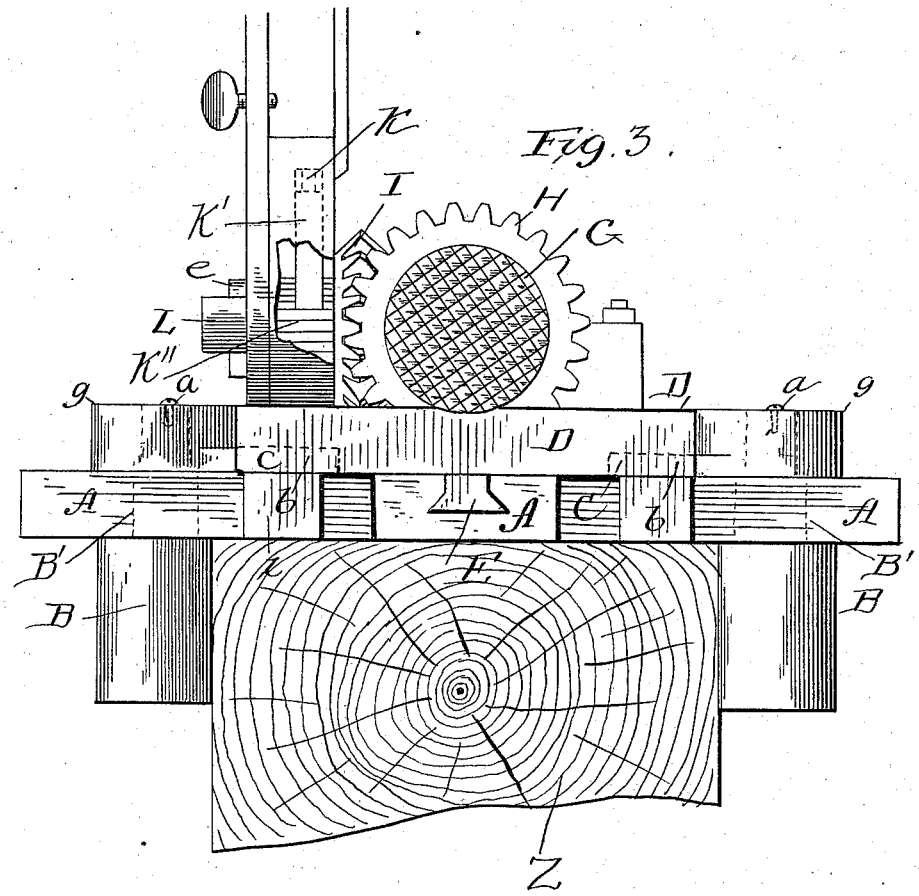

(No Model.) 2 Sheets—Sheet 1.
W. P. TOOMER.
TRESTLE LINER OR POWER JACK.
No. 558,121. Patented Apr. 14, 1896.
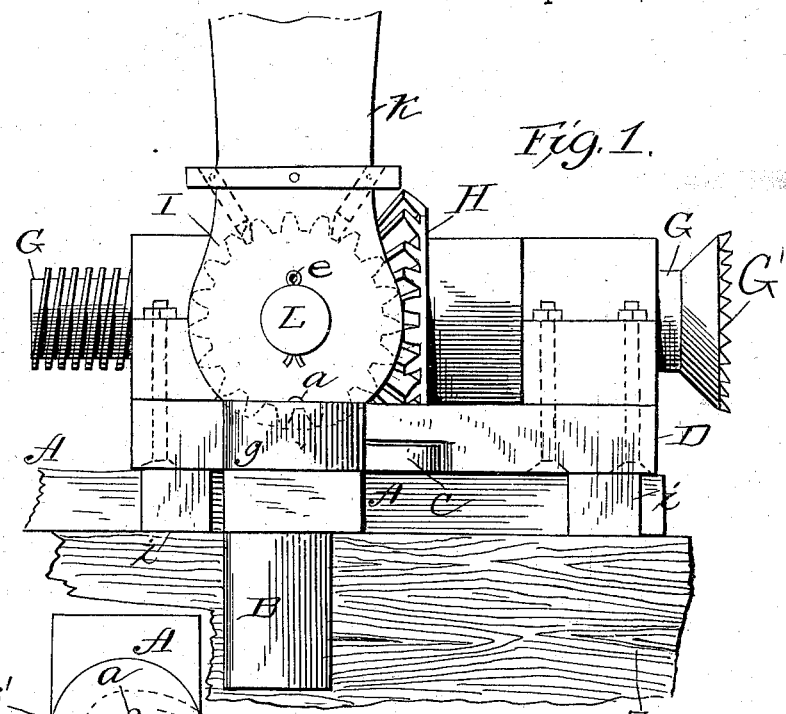
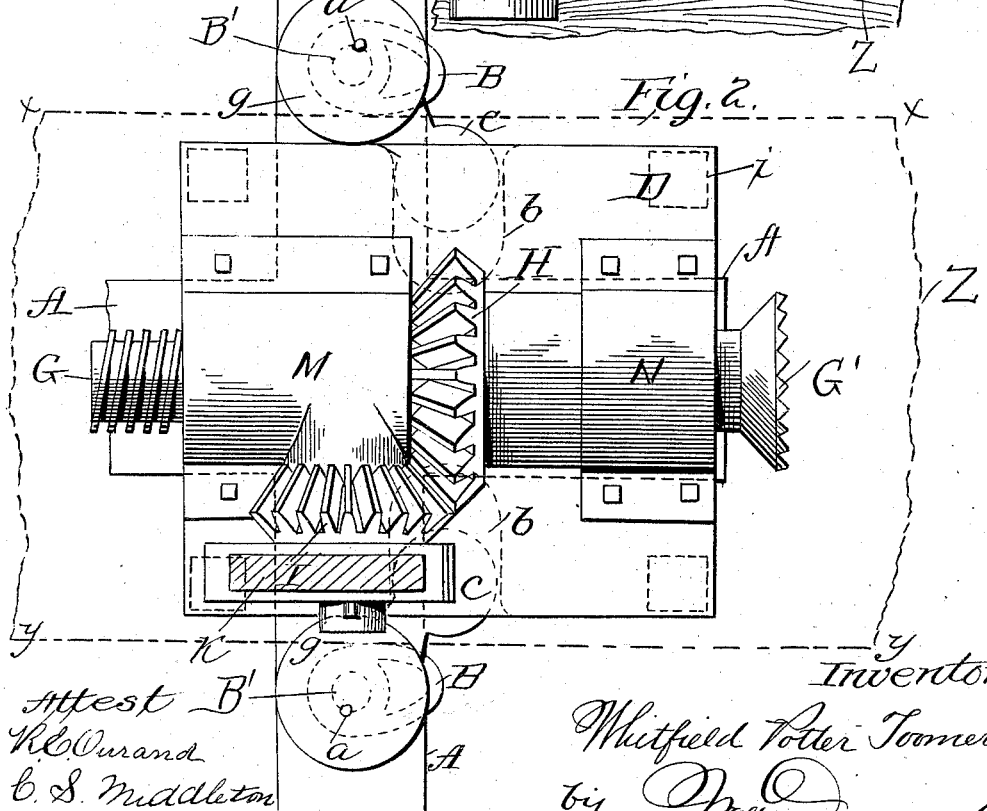
Attest
R. C. Ourand
C. S. Middleton
Inventor
Whitfield Potter Toomer
by Waller ___
Att'ys (No Model.) 2 Sheets—Sheet 2.
W. P. TOOMER.
TRESTLE LINER OR POWER JACK.

No. 558,121. Patented Apr. 14, 1896.

Attest
R. E. Onrand
C. S. Middleton

Inventor
Whitfield Potter Toomer
by
Att'ys.

UNITED STATES PATENT OFFICE.

WHITFIELD POTTER TOOMER, OF WILMINGTON, NORTH CAROLINA.

TRESTLE-LINER OR POWER-JACK.

SPECIFICATION forming part of Letters Patent No. 558,121, dated April 14, 1896.

Application filed November 20, 1895. Serial No. 569,530. (No model.)

*To all whom it may concern:*

Be it known that I, WHITFIELD POTTER TOOMER, a citizen of the United States, residing at Wilmington, in the county of New Hanover and State of North Carolina, have invented a new and useful Trestle-Liner or Power-Jack, of which the following is a specification.

My invention is a power-jack, and the features thereof will be described hereinafter, and particularly pointed out in the claims.

In the drawings, Figure 1 is a side view of the invention; Fig. 2, a plan view, and Fig. 3 an end view.

The jack-screw G turns in bearings M N on a plate D and is operated through the gear H on the screw-shaft and the gear I on the transverse pin L, which gear I is operated by a lever K, having a pawl-and-ratchet connection K' K'' with the gear I, as shown in Fig. 3, the lever K being held on the pin by the key e.

The plate D is connected with and arranged to slide on a base-plate A of cross form, as indicated in dotted lines of Fig. 2, the connection, as in Fig. 3, being made by a dovetail E. The plate A has journaled therein the shafts B' of eccentrics or grips B, which latter project below the plate A and down along each side of the timber or beam Z, while the upper ends of the eccentric shafts have the circular disks g, secured thereto by the keys or pins a, and these circular disks fit against the edges of the plate D to guide the same in its movements. The plate D has recesses b in its opposite edges to receive the rounded ends of levers C, projecting from the disks g on the eccentric shafts.

When the device is placed on the beam, as in Figs. 1 and 3, with the eccentrics or grips extending down along each side of the beam, the device is ready for operation. The eccentrics stand substantially as in Fig. 2, supposing the width of the beam to be that shown by the dotted lines x x y y—that is, the plates A and D are so adjusted relatively to each other that the low portions of the eccentrics will be just bearing on the sides of the timber, and thus when the screw is turned with its serrated head G' against the work the first effect will be a back thrust of the plate D, moving slightly on the plate A, which, through the levers C, the disks g, and eccentric shafts, will turn the latter to clamp the higher parts thereof upon the timber sides, thus clamping the device firmly in place, after which the continued turning of the screw will advance the same to do the work required.

Studs i extend down from the corners of the plate D to support the same, these studs resting on the top of the timber, and these will act as stops for the longitudinal movement of the plate D in relation to the plate A by coming in contact with the said plate A.

What I claim as my invention is—

1. In combination, the jack-screw, the plate carrying the same, a second plate carrying the jack-holding plate so that the latter may slide thereon, grips carried by said second plate and connections from said grips extending to the sliding plate to be operated by the movement thereof.

2. In combination, the jack-screw, the sliding plate carrying the same, the grip-plate having the eccentric grips thereon and the levers for operating the grips, said sliding plate having recesses for receiving the operating-levers, substantially as described.

3. In combination, the jack-screw, the sliding plate carrying the same, the grip-plate on which the sliding plate moves, the grips on the grip-plate eccentrically arranged, the heads C, C, extending above the grip-plate and confining the sliding plate laterally and the connections between the sliding plate and grips, substantially as described.

4. In combination, the jack-screw, the plate D carrying the same, the plate A, the dovetail connection between the plates, the grips carried by the plate A, the connections between said grips and the plate D and means for operating the jack-screw.

5. In combination, the jack-screw, the plate D carrying the same with means for operating the screw, the plate A of cross form upon which the plate D slides, the grips journaled in the lateral arms of the plate A, a sliding connection between the plates A and D and connections from the plate D to the grips, substantially as described.

WHITFIELD POTTER TOOMER.

Witnesses:
J. H. McREE,
J. McREE HATCH.